ns up to thirty parts by weight of the silane in one hundred parts by weight of water to which an acidifying agent which results in a pH from 3 to 4 has been added.

United States Patent Office 2,763,629
Patented Sept. 18, 1956

2,763,629

PRODUCT FOR TREATING GLASS FIBERS FOR IMPROVING THE ADHESION OF RESINS THERETO

Adolph Gottfurcht, Los Angeles, Calif., assignor, by mesne assignments, to L-O-F Glass Fibers Company, Toledo, Ohio, a corporation of Ohio No Drawing. Application March 25, 1952,
Serial No. 278,492

11 Claims. (Cl. 260—29.2)

This invention relates to the treatment of glass fibers and glass fiber products to improve the adhesion thereto of polyester resins.

One object of the invention is to provide a surface treatment for glass fibers which improves the adhesion thereto of synthetic resins. Another object is to provide a surface treating agent which improves the adhesion of plastic resin materials to glass fibers and which resists the loss of adhesion under high humidity conditions or immersion in water. Another object is to increase the strength of fiber-reinforced plastic resin bodies. A further object is to provide a treatment at the time of production of the glass fibers which results in improved adhesion of plastic materials to the fibers. Another object is to provide a stable sizing material for glass fibers which does not inhibit the curing of the resin in which the fibers are later incorporated. A still further object is to provide an after-treatment for fibrous glass products which have initially been lubricated with other lubricating agents at the time of production, and necessary in the fabrication of glass yarns and the weaving of cloth and which is subsequently removed by chemical means or by heat. A further object is to provide sized glass fibers having improved adhesion to plastics, and greater resistance to the effect of moisture on laminates and the like, utilizing the treated fiber. Another object is to provide a stable aqueous solution of a hydrolyzate of alkoxysilanes, such as vinyl triethoxysilane, in both the acid and the alkaline range of pH values.

These and other objects of my invention are attained by following the process and preparing the treating agents as will now be described. I have discovered that stable aqueous solutions of alkenyl silicone esters may be prepared, and also that glass fibers and glass fiber products when treated with suitable water dilutions of said solutions and dried, provide on said glass fibers a film or surface treatment which results in greatly improved adhesion of unsaturated addition type polymerizable resinous materials in which the fibrous glass products are incorporated as reinforcing agents, and greatly improved resistance of such products to lowering of strength under high humidity conditions or immersion in water.

I prefer to use vinyl triethoxysilane for the treatment of glass fibers and fibrous glass products in accordance with my invention. The vinyl group, because of its active nature, has been found to be particularly effective in improving the adhesion of resins or plastics to the surface of the glass fibers. The use of the stable water solutions of the hydrolyzates of alkenyl silicone esters of my invention provides a simple and effective treating process for glass fibers. The aqueous solutions of other alkenyl silicone esters such as α-chloro vinyl triethoxy silane, β-chloro vinyl triethoxy silane and bicycloheptenyl triethoxy silane have also been found to result in improved adhesion and water resistance.

The stable aqueous hydrolyzate solutions are prepared by first dissolving or hydrolyzing the silane at concentrations up to thirty parts by weight of the silane in one hundred parts by weight of water to which an acidifying agent which results in a pH from 3 to 4 has been added. The initially immiscible mixture of silane and water is vigorously stirred until a clear homogeneous solution is obtained, this requiring from thirty minutes to as long as six hours. The solutions so prepared remain clear and usable for short periods up to two or three days. They may be made permanently stable by the rapid addition of caustic alkali. If the caustic alkali is slowly added to the hydrolyzate, as prepared above, a milky precipitate forms which is not redissolved by further additions of alkali. But if the predetermined amount of alkali is quickly added and rapidly mixed in, a clear stable solution results.

The original dissolving or hydrolysis of the silane in water is best brought about under conditions resulting in a pH of 3 to 3.5, usually by the addition of formic or other suitable acid. The higher the pH value the longer it takes to dissolve or hydrolyze the silane to a clear homogeneous solution.

Example 1

A mixture of 2 parts by volume of vinyl triethoxy silane and 18 parts by volume of water was adjusted to a pH of about 4 by the addition of a 5 percent aqueous solution of formic acid. This mixture was vigorously stirred until a clear solution was obtained. The solution was then diluted with water to 40 volumes and while it was being vigorously stirred, 4.8 volumes of five percent aqueous caustic soda solution was quickly added. The final solution had a pH of 11.4. The final solution was stable for periods of several weeks or more.

Example 2

To 100 volumes of the alkaline solution of Example 1 there were added 6 volumes of formic acid solution (equal parts by volume of 90 percent formic acid and water), with vigorous stirring. A clear solution having a pH of 4 was obtained. Caustic stabilized solutions of vinyl triethoxy silane hydrolyzate may be made, containing up to 20 percent of the silane, it being necessary to increase the caustic soda proportionally.

Example 3

A mixture of 720 volumes of vinyl triethoxy silane, 2880 volumes of water, and 2 volumes of hydrochloric acid (5 percent) was stirred vigorously until a clear solution resulted. While the vigorous stirring was continued, 575 volumes of caustic soda solution (20 percent) was quickly added. The resulting clear solution remained stable for many weeks.

A large excess of the caustic alkali is to be avoided because it deleteriously affects the bonding strength of the laminates made with glass fiber treated with the hydrolyzate solution. If too little caustic alkali is used, the solution does not remain clear. Caustic soda and caustic potash have been found the be satisfactory in my process of stabilizing the silane solutions, but weaker alkalis such as ammonia or triethanolamine do not stabilize the hydrolyzate solutions. A pH of at least about 11 has been found necessary, and the maximum amount is determined by the effect of an excess over the optimum amount which will adversely affect the glass fiber in subsequent operations.

Where an alkaline solution is undesirable, the solution may be made weakly acid by the addition of acid to the desired acidity prior to its use in treating the glass fibers.

For application to fiber glass products which have been fabricated from fibers treated in the usual manner with lubricants such as starch, gelatine or the like, it is important to preclean the glass fiber or the fiber glass product, and this is best done by burning off the usual lubricating material, usually at a temperature of about 650° to 1100 Fahrenheit. The heat cleaned cloth, preform, or sliver is then dipped or sprayed with the dilute silane solution prepared in active form as described, and then dried and heat set at 225° to 375° F. for about three minutes. My solutions may, of course, be applied to glass fibers and glass fiber products which have not been previously sized, by spraying, wiping or dipping, and setting as above described.

In order to show the improvement in the adhesion of resinous glass fiber, I have prepared laminated panels using glass fiber cloth treated with my silane solutions as above described, bonded by several varieties of commercial synthetic resins of the addition polymerizable type known as low pressure resins or unsaturated polyester resins.

The laminates were made by saturating eleven layers of glass cloth with a resin that previously had been catalyzed with one per cent benzoyl peroxide. After the air had been worked out from between the layers of glass cloth, the laminate assembly was placed in a cold press. The press was closed down against 1/8 inch thick spacers. This was done to maintain the resin content of the laminate in the range of 38 plus or minus 2 per cent. The platens were then heated up to a temperature of 250° Fahrenheit in a period of fifteen to twenty minutes and held at that temperature for an additional thirty minutes. The laminated panel was then removed from the press and allowed to col at room temperature. The laminate was cut into test strips and the physical properties measured. The following table gives a summary of the results obtained.

| Resin | Resin Content, Percent | Flexural Strength, p. s. i. | | Cloth Finish (Pre-treatment) |
|---|---|---|---|---|
| | | Dry | 30 days' immersion in water | |
| A. (Paraplex P-43) | 38-40 | 65,025 | 60,900 | 2 percent vinyl triethoxy silane, Example 1. |
| B. (Selectron 5003) | 38-40 | 51,300 | 47,200 | Do. |
| C. (Paraplex P-43) | 38-40 | 59,600 | 38,500 | 114. |
| D. (Selectron 5003) | 38-40 | 57,300 | 34,400 | 114. |
| E. (Selectron 5003) | 38-40 | 51,500 | 48,300 | Vinyl triethoxy silane, Example 2. |

The test laminates C and D were prepared in the same manner as A and B, but the glass fiber cloth had been pretreated with "finish 114," a methacrylate-chromic chloride complex material which is commonly supplied on glass cloth by many finishing companies. The comparison between the two groups indicates the advantage of treating with the water solutions or hydrolyzates prepared as above described.

The flexural strengths were determined according to Federal Specifications L-P-406a.

The advantages of improved adhesion and of improved resistance to deterioration of strength under high humidity conditions will be apparent from the data given. Other advantages are the white color of the fiber treating agent after curing which permits the making of colorless laminates and the lack of inhibition of resin cure due to any excess treating agent remaining on the fiber after treatment.

Loose glass fibers and glass fiber preforms for use with resins may also be treated or sized with the special solutions herein described with comparable improvement in the adhesion between the resin and the glass fibers, and similar resistance to water deterioration of the adhesion. Likewise, the solutions may be applied to the glass fibers as a size, as the fibers are spun. Where necessary or desired, the treated glass fabric, or the fabric made from treated fibers, may be water washed to remove soluble salts. This water treatment is especially important where the salts interfere with the physical or electrical properties. Where the expression "glass fibers" is used in this specification and the claims, it is intended to include single glass fibers, slivers, strands, yarns, mats, woven glass fiber cloth and any other forms of glass fiber.

The polyester resins referred to herein are commonly known as low pressure resins, unsaturated polyester resins, or thermosetting resins of the addition polymerization type. They are available commercially under the trade names as follows:

a. Selectron Resins manufactured by Pittsburgh Plate Glass Company.
 b. Paraplex Resins manufactured by Resinous Products Division, Rohm and Haas Company.
 c. Vibrin Resins manufactured by Naugatuck Chemical Division, U. S. Rubber Company.
 d. Laminac Resins manufactured by American Cyanamid Company.

Some of the specific resinous or polymerizable chemical compounds that can be used are:

Diallyl phthalate and its copolymers
Diallyl phenyl phosphonate and its copolymers
Triallyl cyanurate and its copolymers
Diallyl cyanamide and its copolymers.

I claim:

1. The method of preparing stable dilute aqueous hydrolyzed solutions of an alkoxy silane containing a radical selected from the group consisting of vinyl, $\alpha$ chloro vinyl and $\beta$ chloro vinyl radicals attached to silicon and at least 2 alkoxy groups, the only groups attached to silicon being one of the radicals of said group and alkoxy radicals, comprising the steps of mixing from one to thirty parts by weight of the silane to one hundred parts by weight of water, adjusting the pH to the range of 3 to 5, vigorously stirring said mixture until a clear homogeneous solution is obtained, and then quickly adding and rapidly mixing with said clear solution sufficient caustic alkali to produce a clear solution having a pH of at least 11.

2. The method of preparing stable dilute aqueous hydrolyzed solutions of a vinyl alkoxy silane containing at least 2 alkoxy groups, the only radicals attached to silicon being vinyl and alkoxy radicals, comprising the steps of mixing from one to thirty parts by weight of said silane to one hundred parts by weight of water, adjusting the pH to the range of 3 to 5, vigorously stirring said mixture until a clear homogeneous solution is obtained, and then quickly adding and rapidly mixing with said solution sufficient caustic alkali to produce a clear solution having a pH of at least 11.

3. The method of preparing stable dilute aqueous hydrolyzed solutions of vinyl triethoxysilane comprising the steps of mixing from one to thirty parts by weight of the silane to one hundred parts by weight of water, adjusting the pH to the range of 3 to 5, vigorously stirring said mixture until a clear homogeneous solution is obtained, and then quickly adding and rapidly mixing with said solution sufficient caustic alkali to produce a clear solution having a pH of at least 11.

4. The method of preparing stable dilute aqueous hydrolyzed solutions of $\alpha$ chloro vinyl triethoxysilane comprising the steps of mixing from one to thirty parts by weight of the silane to one hundred parts by weight of water, adjusting the pH to the range of 3 to 5, vigorously stirring said mixture until a clear homogeneous solution is obtained, and then quickly adding and rapidly mixing with said solution sufficient caustic alkali to produce a clear solution having a pH of at least 11.

5. The method of preparing stable dilute aqueous hydrolyzed solutions of $\beta$ chloro vinyl triethoxysilane comprising the steps of mixing from one to thiry parts by weight of the silane to one hundred parts by weight of water, adjusting the pH to the range of 3 to 5, vigorously stirring said mixture until a clear homogeneous solution is obtained, and then quickly adding and rapidly mixing with said solution sufficient caustic alkali to produce a clear solution having a pH of at least 11.

6. The method of preparing stable dilute aqueous hydrolyzed solutions of an alkoxy silane containing a radical selected from the group consisting of vinyl, α chloro vinyl and β chloro vinyl radicals attached to silicon and at least 2 alkoxy groups, the only groups attached to silicon being one of the radicals of said group and alkoxy radicals, comprising the steps of mixing from one to thirty parts by weight of the silane to one hundred parts by weight of water, adjusting the pH to the range of 3 to 5, vigorously stirring said mixture until a clear homogeneous solution is obtained, then adding caustic alkali to produce a clear solution having a pH of at least 11, and then neutralizing said solution with acid to a pH of not greater than about 5.

7. The method of preparing stable dilute aqueous hydrolyzed solutions of a vinyl alkoxy silane containing at least 2 alkoxy groups, the only radicals attached to silicon being vinyl and alkoxy radicals, comprising the steps of mixing from one to thirty parts by weight of said silane to one hundred parts by weight of water, adjusting the pH to the range of 3 to 5, vigorously stirring said mixture until a clear homogeneous solution is obtained, then quickly adding and rapidly mixing with said solution sufficient caustic alkali to produce a clear solution having a pH of at least 11, and then neutralizing said solution with acid to a pH of not greater than about 5.

8. The method of preparing stable dilute aqueous hydrolyzed solutions of vinyl triethoxysilane comprising the steps of mixing from one to thirty parts by weight of the silane to one hundred parts by weight of water, adjusting the pH to the range of 3 to 5, vigorously stirring said mixture until a clear homogeneous solution is obtained, then quickly adding and rapidly mixing with said solution sufficient caustic alkali to produce a clear solution having a pH of at least 11, and then neutralizing said solution with acid to a pH of not greater than about 5.

9. The method of preparing stable dilute aqueous hydrolyzed solutions of α chloro vinyl triethoxysilane comprising the steps of mixing from one to thirty parts by weight of the silane to one hundred parts by weight of water, adjusting the pH to the range of 3 to 5, vigorously stirring said mixture until a clear homogeneous solution is obtained, then quickly adding and rapidly mixing with said solution sufficient caustic alkali to produce a clear solution having a pH of at least 11, and then neutralizing said solution with acid to a pH of not greater than about 5.

10. The method of preparing stable aqueous hydrolyzed solutions of β chloro vinyl triethoxysilane comprising the steps of mixing from one to thirty parts by weight of the silane to one hundred parts by weight of water, adjusting the pH to the range of 3 to 5, vigorously stirring said mixture until a clear homogeneous solution is obtained, then quickly adding and rapidly mixing with said solution sufficient caustic alkali to produce a clear solution having a pH of at least 11, and then neutralizing said solution with acid to a pH of not greater than about 5.

11. A composition prepared in accordance with the method of claim 1.

References Cited in the file of this patent

UNITED STATES PATENTS

| | | |
|---|---|---|
| 2,441,422 | Krieble et al. | May 11, 1948 |
| 2,486,162 | Hyde | Oct. 25, 1949 |
| 2,502,286 | Sowa | Mar. 28, 1950 |
| 2,574,265 | Hyde | Nov. 6, 1951 |
| 2,649,396 | Witt et al. | Aug. 18, 1953 |
| 2,688,006 | Steinman | Aug. 31, 1954 |